No. 876,937. PATENTED JAN. 21, 1908.
A. T. BROWN.
POWER TRANSMITTING MECHANISM.
APPLICATION FILED SEPT. 6, 1904.

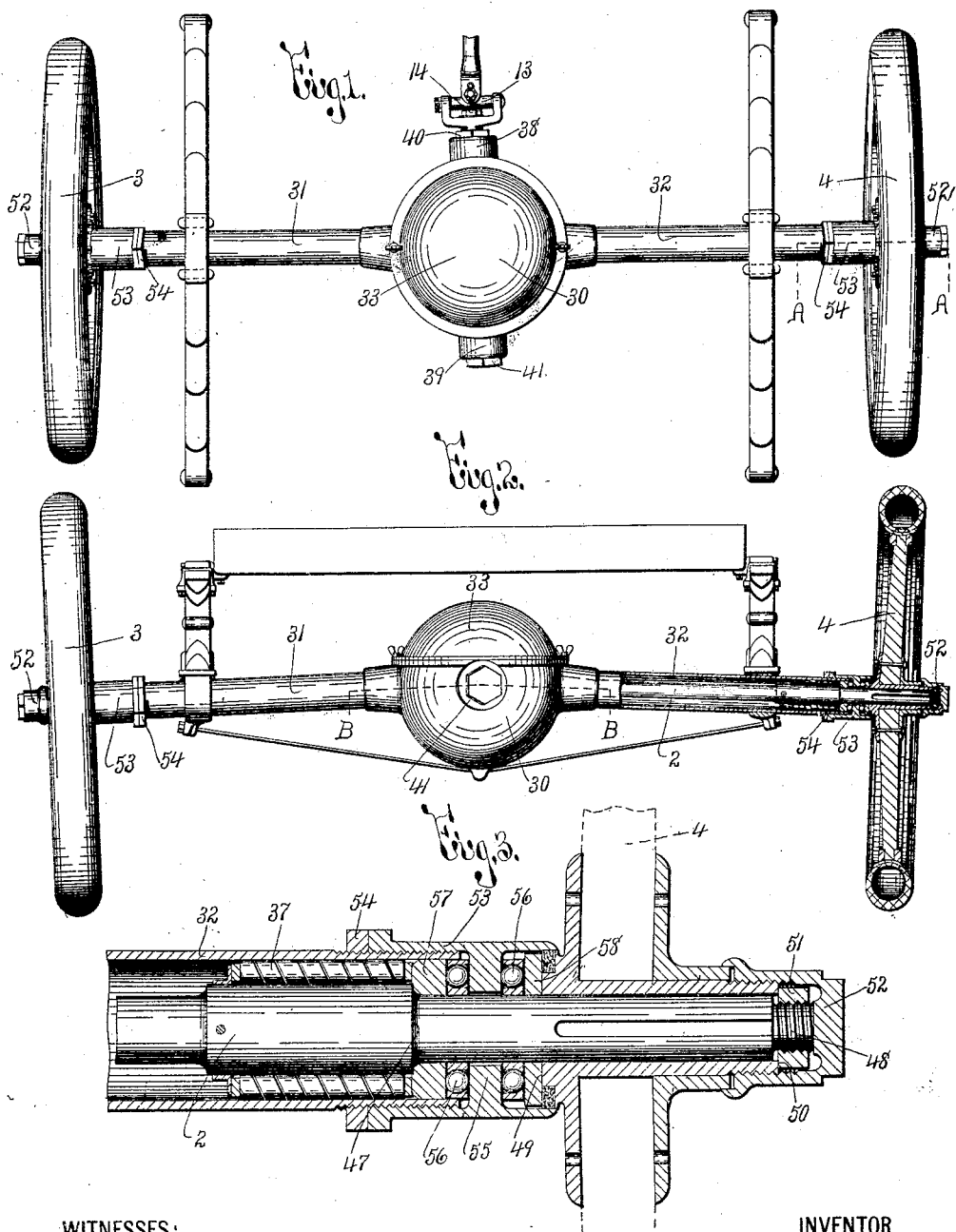

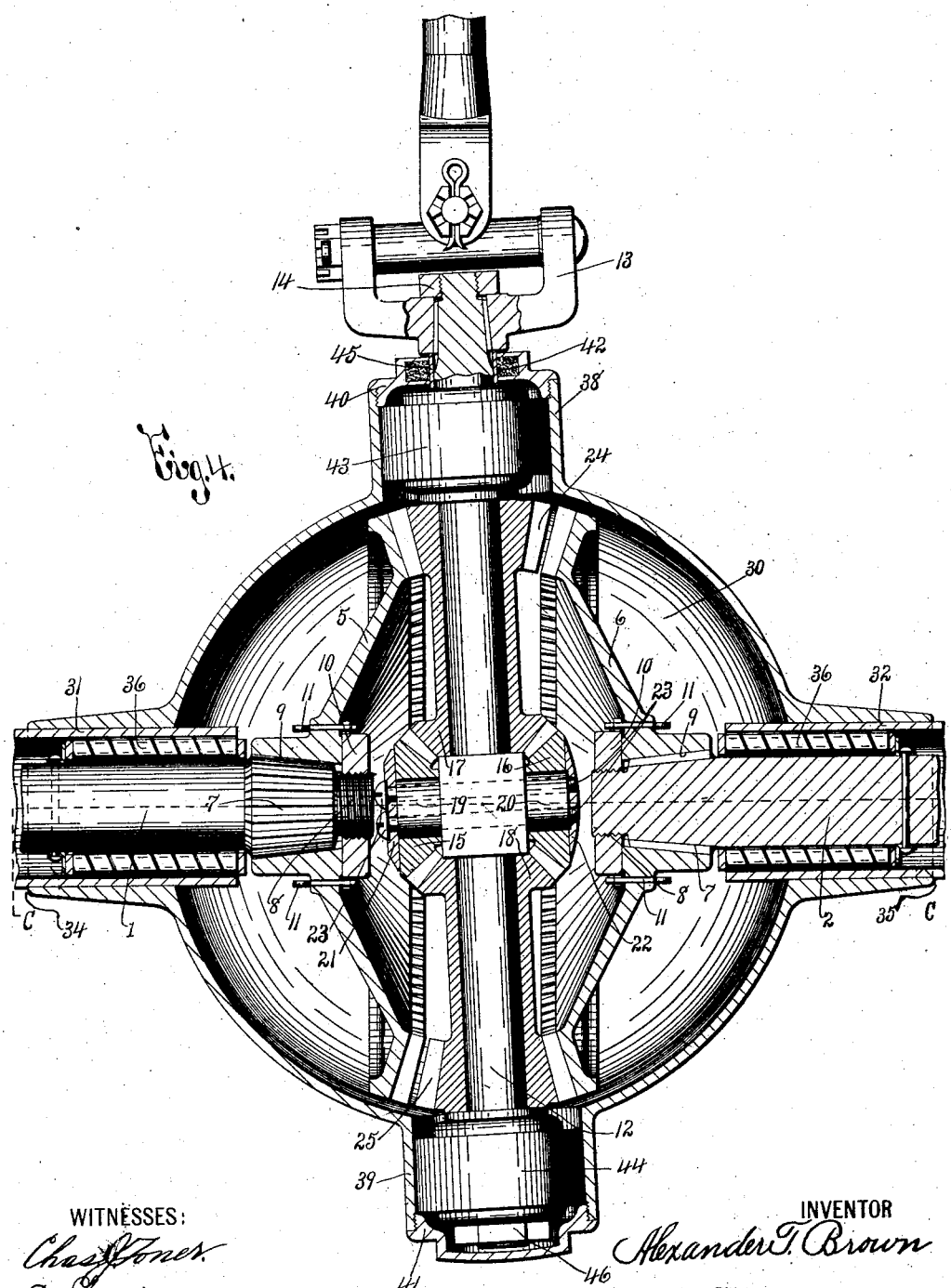

3 SHEETS—SHEET 3.

WITNESSES:
Chas. Foner.
D. Laurie.

INVENTOR
Alexander T. Brown
BY
Hey & Parsons
ATTORNEYS

UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A COPARTNERSHIP.

POWER-TRANSMITTING MECHANISM.

No. 876,937.  Specification of Letters Patent.  Patented Jan. 21, 1908.

Application filed September 6, 1904. Serial No. 223,371.

*To all whom it may concern:*

Be it known that I, ALEXANDER T. BROWN, of Syracuse, in the county of Onondaga and State of New York, have invented a certain new and useful Power-Transmitting Mechanism, of which the following is a specification.

This invention relates to power-transmitting mechanism, particularly applicable for use in self-propelled vehicles, and has for its object the production of a mechanism for the desired purpose which is especially simple in construction and highly efficient and durable in use; and to this end, it consists in the novel combinations and constructions hereinafter set forth and pointed out in the claims.

In describing this invention, reference is had to the accompanying drawings in which like characters designate corresponding parts in all of the views.

Figure 5:
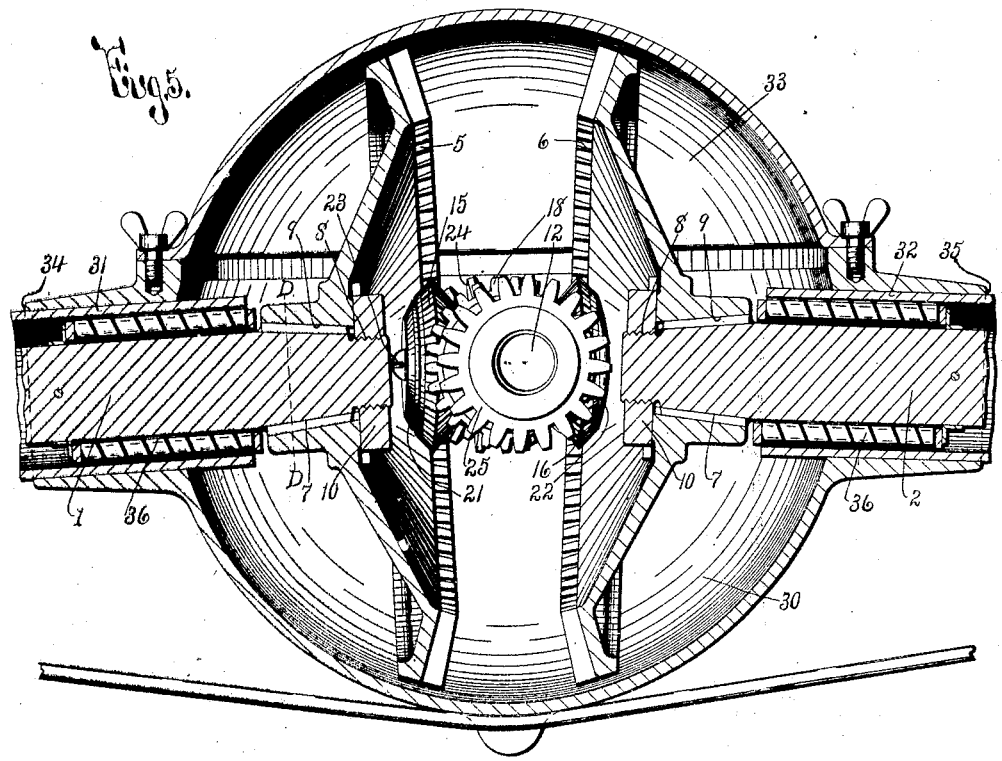
Figure 6:
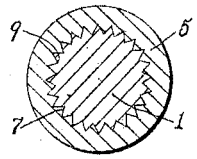

Figure 1 is a top plan of a portion of a self-propelled vehicle including one embodiment of my invention. Fig. 2 is a rear elevation, partly in section, of the means shown in Fig. 1, a portion of the body of the vehicle being also illustrated. Fig. 3 is an enlarged sectional view partly in elevation, on line A—A, Fig. 1, a part of the ground-wheel being omitted. Fig. 4 is an enlarged sectional view, partly in elevation, on line B—B, Fig. 2. Fig. 5 is a sectional view, partly in elevation, on line C—C, Fig. 4. Fig. 6 is a detail sectional view on line D—D, Fig. 5.

The illustrated exemplification of this invention includes driven and driving members, and equalizing and transmitting gears. As best seen in Figs. 2 and 4, the driven members 1, 2 constitute an axle, are arranged end to end with the opposing ends of their axes substantially coincident with each other, and are inclined relatively to each other lengthwise of their axes from a horizontal plane. The outer ends of the driven members 1, 2 are equipped with ground-wheels 3, 4, and their inner ends are provided with gears 5, 6, the opposing surfaces of said gears being separated and formed with the teeth thereof. As shown, said inner ends of the driven members are provided with tapered peripheral surfaces 7 decreasing in diameter toward the end faces of said ends, and having lengthwise ribs thereon, and said inner ends are also provided with threaded peripheral surfaces 8 adjacent the smaller ends of the surfaces 7; and the hubs of the gears 5, 6 are formed with tapered openings 9 for receiving and closely fitting the surfaces 7, said openings decreasing in diameter toward their inner ends and being provided with lengthwise ribs coacting with the corresponding ribs on the surfaces 7. Suitable nuts 10 are adjustable lengthwise of the threaded surfaces 8, and engage the opposing portions of the inner faces of the gears 5, 6 for forcing said gears lengthwise of the surfaces 7 toward the larger ends of said surfaces and firmly securing the gears in position. Said nuts are held in their adjusted position by any desirable retaining means, as cotter-keys 11 passed through the webs of the gears 5, 6 and having their inner ends detachably engaged with shoulders provided on said nuts.

The described means for securing the gears 5, 6 to the driven members permits of the ready detachment of said gears when desired, but it is apparent that these gears may be otherwise fastened to the driven members, and hence I do not limit my invention to said securing means which forms the subject matter of my divisional application.

The driving member 12 extends beyond opposite sides of the axes of the driven members 1, 2 at an angle other than a right angle to said axes, is fixed from movement laterally relatively to the driven members, and is interposed between the gears 5, 6. Said driving member preferably consists of a shaft which supports the equalizing and transmitting gears, and is connected to any suitable source of power, as an engine-shaft, not illustrated, by a universal connection, one member 13 of said connection being secured to an end of the driving member in the same manner that the gears 5, 6 are fastened to the opposing ends of the driven members, and said member 13 being held in its adjusted position by a nut 14 screwing upon a threaded extremity of the member 12.

In the illustrated embodiment of my invention, bevel equalizing gears 15, 16, 17, 18 are supported by the driving member 12 and rotate therewith, the gears 15, 16 being arranged to extend on opposite sides of the axes of the driven members 1, 2, and with their axes at an angle to the axis of the driving member, and being revoluble on their axes relatively to the driven and driving members; and the gears 17, 18 being revoluble relatively to the driving member about the axis thereof, and being arranged at opposite sides of the gears 15, 16 and the axes of the driven members. Said equalizing gears 15, 16 are preferably mounted on trunnions 19, 20 projecting from opposite sides of an enlargement of the driving member 12 interposed between the equalizing gears 17, 18, this enlargement having opposite surfaces thereof engaged with the opposing or inner end faces of the gears 17, 18. Suitable collars 21, 22 are engaged with the equalizing gears 15, 16 and are secured to the trunnions 19, 20 by any desirable means, as pins 23, arranged parallel with each other, and provided at corresponding ends with heads engaged with the outer face of one of the collars, and at their other ends with threads engaging the opposite collar.

The transmitting gears 24, 25 are preferably of similar size, are loosely mounted on the driving member 12 at opposite sides of the gears 15, 16 and the axes of the driven members 1, 2, and are revoluble with the equalizing gears 17, 18 relatively to the driving member 12 about the axis thereof, being usually integral with said equalizing gears 17, 18. One side of the transmitting gear 24 meshes, at one side of the axes of the driven members 1, 2 and at one side of the axis of the driving member 12, with the gear 5 on the driven member 1, and said gear 24 is disconnected from the gear 6 on the driven member 2, and the transmitting gear 25 meshes at the opposite side of the axes of the driven members 1, 2 and at the opposite side of the axis of the driving member 12 with the gear 6 and is disengaged from said gear 5.

It will be apparent to those skilled in the art, that equalizing and transmitting gears constructed and arranged as described, form a particularly compact, simple efficient, strong and durable connection between the driven and driving members, and that such connection consists of a minimum number of parts, and when transmitting motion from the driving to the driven members, equalizes the strain on opposite sides of the axes of said members, and also permits of the necessary differential movement of the driven members. By inclining the driven members lengthwise of their axes from a horizontal plane, it is possible to incline the ground-wheels relatively to a perpendicular as may be desired. It is apparent, however, that the driven members may be arranged with their axes in a horizontal plane. The inclination of the driving member from a line at a right angle to the axes of the driven members facilitates the desired arrangement of the transmitting gears, but I do not limit my invention to a driving member having such inclination.

In the illustrated embodiment of my invention, the driven and driving members 1, 2, 12, are supported by a casing 30 comprising a central part and tubular shells or extensions 31, 32. The central part of the casing 30 is provided with a detachable cap 33, and is formed with opposing side openings 34, 35 through which the driven members 1, 2 project, these openings being inclined relatively to each other lengthwise of their axes from a horizontal plane, and having their axes substantially coincident with the axes of the driven members 1, 2. Said tubular shells or extensions 31, 32 form continuations of the parts of the casing provided with the openings 34, 35, and encircle and support the driven members 1, 2, suitable anti-friction bearings 36, 37 for supporting the driven members 1, 2 being provided in the inner and outer ends of these extensions. The central part of the casing 30 is also provided with opposing tubular extensions 38, 39 arranged substantially midway between the openings 34, 35 with their axes at an angle, other than a right angle, to the axes of the openings 34, 35, these extensions having their outer ends provided with detachable caps 40, 41, the cap 40 being provided with a central opening 42 through which the driving member 12 projects, and the axis of this opening being substantially coincident with that of the driving member. Suitable antifriction bearings 43, 44 are provided on the driving member 12 and arranged in the tubular extensions 38, 39 of the casing 30. A sleeve 45 within the opening 42 engages the member 13 fixed to the driving member 12, and also engages means, as a part of the bearing 43 encircling the driving member 12 and engaging the outer end of the transmitting gear 24. The corresponding end of the transmitting gear 25 engages means, as a part of the bearing 44 encircling the driving member 12 and engaging a shoulder 46 fixed to the driving member, and adjustable toward and from the sleeve 45, and as will be obvious to those skilled in the art the sleeve 45 and the shoulder 46 prevent endwise movement of the transmitting gears 24, 25 from each other. The described casing is simple in construction, and forms a particularly efficient means for supporting and incasing the driven and driving members and the equalizing and transmitting gears of my power-transmitting mechanism, but it is apparent that other means may be used for supporting and incasing these parts, and therefore I do not restrict this invention to said casing.

In the preferable construction of my power transmitting mechanism, I provide for the adjustment of the ground-wheels, and of the driven members. As best seen in Fig. 3, the outer ends of the driven members are provided with annular shoulders 47 arranged within the outer ends of the tubular shells or extensions surrounding and supporting the driven members. Said outer ends of the driven members project beyond the outer ends of such tubular shells or extensions and terminate in reduced peripherally-threaded extremities 48. The hubs of the ground-wheels are mounted on the projecting ends of the driven members 1, 2 at the outer sides of the tubular shells or extensions 31, 32, and are each provided with inner and outer engaging surfaces 49, 50, the latter surfaces being engaged by nuts 51 adjustable lengthwise of the extremities 48 of the driven members. Suitable caps 52 are adjustable lengthwise of the outer ends of the hubs of the ground-wheels, and are provided with inner surfaces engaging the end faces of the reduced threaded extremities 48 of the driven members Sleeves 53 encircle the inner or opposing ends of the hubs of the ground-wheels and the outer ends of the tubular shells or extensions 31, 32, being preferably provided with internal threads engaging corresponding threads on the shells or extensions 31, 32 for adjusting the sleeves 53 lengthwise of said shells or extensions. Locknuts 54 engage the opposing end faces of the sleeves 53 for holding said sleeves in their adjusted position. The inner faces of the sleeves 53 are provided with annular shoulders 55 arranged between the shoulders 47 and the engaging faces 49. Antifriction members, as balls 56, engage opposite sides of the shoulders 55 and the opposing surfaces of bearing collars 57 58 having their opposite surfaces engaged respectively with the shoulders 47 and the surfaces 49. To those skilled in the art, it will be apparent that by varying the position of the nuts 51 and the caps 52, the ground-wheels are adjusted lengthwise of the driven members as desired, and that by adjusting the sleeves 53, the driven members with their ground-wheels are moved endwise toward and from each other, thus adjusting the gears 5, 6 axially relatively to the gears 24, 25. It will also be apparent that the extensions 31, 32, the hubs of the ground-wheels, the caps 52, and the sleeves 53, constructed and arranged as described, effectually prevent entrance of dust to the driven members.

The construction and operation of my power-transmitting mechanism will now be readily understood upon reference to the foregoing description and the accompanying drawings, and it will be apparent to those skilled in the art that more or less change may be made in the component parts thereof without departing from the spirit of my invention.

Having thus fully described my invention, what I claim as new and desire to secure by Letters Patent, is:—

1. In a vehicle, a pair of axle sections, a driving gear secured to each of said sections, a shaft passing across the faces of said gears and inclining with respect to the planes thereof, pinions loosely carried on said shaft, each of said pinions having an extension with a gear, and planet gears carried by said shaft and meshing with the said extension gears, the said pinions being on opposite sides of the axle sections and each meshing with one of the driving gears.

2. In a vehicle, a pair of axle sections, a bevel driving gear secured to each of said sections, a shaft passing across the faces of said gears and inclining with respect to the planes thereof, bevel pinions loosely carried on said shaft, each of said pinions having an extension with a gear, a spider frame mounted on said shaft between the said pinions and turning with the shaft, and equalizing gears carried by said spider frame and meshing with the said gears on the said extensions, the said bevel pinions being on opposite sides of the axle sections, and each meshing with one of the driving gears.

3. In a vehicle, a pair of axle sections, a bevel driving gear secured to each of said sections, said gears being of substantially equal diameters, a shaft passing across the faces of said gears and inclining with respect to the planes thereof, bevel pinions loosely carried on said shaft, each of said pinions having an extension with a gear, a spider frame mounted on said shaft between the said pinions and turning with the shaft, and equalizing gears carried by said spider frame and meshing with the said gears on the said extensions, the said bevel pinions being on opposite sides of the axle sections and each meshing with one of the driving gears.

4. In a vehicle, a pair of axle sections, bevel gears on the adjacent ends of said axle sections, said gears being of substantially equal diameters, a drive shaft section passing across the faces of said gears and inclining with respect to the planes thereof, a second drive shaft section, a universal connection between said drive shaft sections, a pair of bevel pinions carried by the first shaft section and having driving connection therewith, said pinions being on opposite sides of the axle sections, the pinion on one side of said axle sections being in mesh with the gear on one section and the other pinion being in mesh with the gear on the other axle section, and means for driving the said second shaft section.

5. In a vehicle, revoluble driven members arranged end to end, gears associated with the driven members and rotating therewith, a bearing fixed from movement laterally relatively to the driven members, and a revoluble driving member journaled in the bearing and connected to said gears and arranged with its axis at an angle, other than a right-angle, to the axes of said driven members, substantially as and for the purpose set forth.

6. In a vehicle, revoluble driven members arranged end to end and inclining relatively to each other lengthwise of their axes from a horizontal plane, and a revoluble driving member connected to the driven members and arranged with its axis at an angle, other than a right-angle, to the axes of said driven members, substantially as and for the purpose described.

7. In a vehicle, revoluble driven members arranged end to end and inclining relatively to each other lengthwise of their axes from a horizontal plane, gears associated with the driven members and rotating therewith, a bearing fixed from movement laterally relatively to the driven members, and a revoluble driving member journaled in the bearing and connected to said gears and arranged with its axis at an angle, other than a right angle, to the axes of said driven members, substantially as and for the purpose specified.

8. In a vehicle, revoluble driven members arranged end to end and inclining relatively to each other lengthwise of their axes from a horizontal plane, a gear associated with each of the driven members and rotating therewith, a revoluble driving member extending on opposite sides of the axes of the driven members with its axis at an angle, other than a right-angle, to said axes, gears revoluble with the driving member and arranged end to end on opposite sides of the axes of the driven members and with their axes substantially coincident with the axis of the driving member, one of the gears revoluble with the driving member being in mesh at one side of the axes of the driven members and at one side of the axis of the driving member with the gear on one of the driven members and out of mesh with the gear on the other driven member, and another of the gears revoluble with the driving member being in mesh at the opposite side of the axes of the driven members and at the opposite side of the axis of the driving member with the gear on said other driven member and out of mesh with the gear on the opposing driven member, substantially as and for the purpose set forth.

9. In a vehicle, revoluble driven gears of substantially equal diameter arranged end to end, transmitting gears arranged on opposite sides of the axes of the driven gears with their axes at an angle, other than a right angle, to the first-mentioned axes, one of the transmitting gears being in mesh with one of the driven gears and out of mesh with the other driven gear, and the other transmitting gear being in mesh with said other driven gear and out of mesh with the opposing driven gear, and equalizing gears connecting the transmitting gears, substantially as and for the purpose described.

10. In a vehicle, an axle comprising a pair of revoluble shafts arranged end to end, ground-wheels carried by the outer ends of the shafts, gears of substantially equal diameter provided on the inner ends of the shafts, a driving member arranged with its axis at an angle, other than a right angle, to said shafts, a gear revoluble with the driving member and being in mesh with the gear on one of the shafts and out of mesh with the gear on the other shaft, a second gear revoluble with the driving member and being in mesh with the gear on said other shaft and out of mesh with the gear meshing with the first-mentioned gear revoluble with the driving member, and equalizing gears carried by the driving member and connected to said gears revoluble with the driving member, substantially as and for the purpose set forth.

11. In a vehicle, an axle comprising a pair of revoluble shafts arranged end to end and inclining relatively to each other lengthwise of their axes from a horizontal plane, ground-wheels carried by the outer ends of the shafts, gears of substantially equal diameter provided on the inner ends of the shafts, a driving member arranged with its axis at an angle, other than a right angle, to said shafts, transmitting gears loosely mounted on the driving member on opposite sides of the axes of the shafts, one of the transmitting gears being in mesh with one of the first-mentioned gears and out of mesh with the other of the first-mentioned gears, and the other transmitting gear being in mesh with said other of the first-mentioned gears and out of mesh with the opposing first-mentioned gear, and equalizing gears carried by the driving member and connected to said transmitting gears, substantially as and for the purpose specified.

12. In a vehicle, revoluble driven gears arranged end to end, a driving member arranged with its axis at an angle other than a right angle to the axes of the driven gears, equalizing gears, one of the equalizing gears being revoluble with the driving member and arranged with its axis at an angle to the axis of the driving member, said one of the equalizing gears being revoluble about its axis relatively to the driven gears and the driving member, and a plurality of the equalizing gears being revoluble with the driving member and arranged with their axes at an angle to the axis of said one of the equalizing gears, and a plurality of transmitting gears revoluble with the driving member and with said plurality of equalizing gears and being in mesh with the driven gears, substantially as and for the purpose set forth.

13. In a vehicle, revoluble driven gears arranged end to end, and inclining relatively to each other lengthwise of their axes from a horizontal plane, a driving member arranged with its axis at an angle other than a right angle to the axes of the driven gears, equalizing gears connected between the driven gears, one of the equalizing gears being revoluble with the driving member and extending on opposite sides of the axes of the driven gears, said one of the equalizing gears being arranged with its axis at an angle to the axis of the driving member and being revoluble on its axis relatively to the driven gears and the driving member, and a plurality of the equalizing gears being revoluble with the driving member and arranged with their axes at an angle to the axis of said one of the equalizing gears, and a plurality of transmitting gears revoluble with the driving member and with said plurality of equalizing gears and being in mesh with the driven gears, substantially as and for the purpose described.

14. In a vehicle, revoluble driven gears arranged end to end, a driving member extending on opposite sides of the axes of the driven gears with its axis at an angle other than a right angle to said axes, equalizing gears connected between the driven gears, one of the equalizing gears being revoluble with the driving member and extending on opposite sides of the axes of the driven gears, said one of the equalizing gears being arranged with its axis at an angle to the axis of the driving member and being revoluble on its axis relatively to the driven gears and the driving member, and a pair of the equalizing gears coacting with said one of the equalizing gears and being revoluble with the driving member, and revoluble relatively thereto about the axis of said driving member, and transmitting gears fixed respectively to said pair of equalizing gears, one of the transmitting gears being in mesh at one side of the axes of the driven gears and at one side of the axis of the driving member with one of the driven gears and out of mesh with the other driven gear, and the other transmitting gear being in mesh at the opposite side of the axes of the driven gears and at the opposite side of the axis of the driving member with said other driven gear and out of mesh with the opposing driven gear, substantially as and for the purpose described.

15. In a vehicle, two revoluble driven gears arranged end to end, a driving member, a gear revoluble with the driving member and being in mesh at one side of the axes of the driven gears with one of the driven gears and out of mesh with the other driven gear, a second gear revoluble with the driving member and being in mesh at the opposite side of the axes of the driven gears with said other driven gear and out of mesh with the first-mentioned gear revoluble with the driving member, and means provided on the driving member at opposite sides of the gears revoluble with said member, such means preventing endwise movement of said gears from each other and being revoluble with the driving member, substantially as and for the purpose described.

16. In a vehicle, two revoluble driven gears arranged end to end, a driving member, a gear revoluble with the driving member and being in mesh at one side of the axes of the driven gears with one of the driven gears and out of mesh with the other driven gear, a second gear revoluble with the driving member and being in mesh at the opposite side of the axes of the driven gears with said other driven gear and out of mesh with the first-mentioned gear revoluble with the driving member, and means provided on the driving member at opposite sides of the gears revoluble with said member, such means preventing endwise movement of said gears from each other and comprising two parts revoluble with the driving member, one of said parts being adjustable toward and from the other, substantially as and for the purpose set forth.

17. In a vehicle, an axle comprising a pair of revoluble shafts arranged end to end, ground-wheels carried by the outer ends of the shafts, gears of substantially equal diameter provided on the inner ends of the shafts, a driving member arranged with its axis at an angle, other than a right angle, to said shafts, a gear revoluble with the driving member and being in mesh with the gear on one of the shafts and out of mesh with the gear on the other shaft, a second gear revoluble with the driving member and being in mesh with the gear on said other shaft and out of mesh with the gear meshing with the first-mentioned gear revoluble with the driving member, equalizing gears carried by the driving member and connected to said gears revoluble with the driving member, and means provided on the driving member at opposite sides of said gears revoluble with the driving member and meshing with the first-mentioned gears, such means preventing endwise movement of said gears revoluble with the driving member, one of said parts being adjustable toward and from the other, substantially as and for the purpose specified.

18. In a vehicle, a casing provided with opposing openings inclining relatively to each other lengthwise of their axes from a horizontal plane, driven members revoluble in the openings and arranged with their axes substantially coincident with the axes of said openings, and driving means within the casing for coöperating with the driven members, substantially as and for the purpose set forth.

19. In a vehicle, a casing provided with opposing openings and with tubular shells alined with the openings and having their axes substantially coincident with the axes of said openings, driven members revoluble in said openings and tubular shells and arranged with their axes substantially coincident with the axes thereof, driving means within the casing for coöperating with the inner ends of the driven members, ground-wheels connected to the other ends of the driven members, and means coacting with the tubular shells and the ground-wheels for preventing the entrance of dust to the driven members, substantially as and for the purpose described.

20. In a vehicle, a casing provided with opposing openings and with projecting tubular shells alined with the openings, an axle comprising a pair of revoluble shafts arranged, respectively, in the tubular shells, gears of substantially equal diameter provided within the casing on the inner ends of the shafts, a driving member arranged with its axis at an angle, other than a right angle, to said shafts, a gear within the casing revoluble with the driving member and being in mesh with the gear on one of the shafts and out of mesh with the gear on the other shaft, a second gear within the casing revoluble with the driving member and being in mesh with the gear on said other shaft and out of mesh with the gear meshing with the first-mentioned gear revoluble with the driving member, equalizing gears within the casing carried by the driving member and connected to said gears revoluble with the driving member, ground-wheels connected to the outer ends of the shafts, and means coacting with the tubular shells and the ground-wheels for preventing the entrance of dust to the revoluble shafts, substantially as and for the purpose set forth.

21. In a vehicle, a casing provided with opposing openings and with tubular shells alined with the openings and having their axes substantially coincident with the axes of said openings, driven members revoluble in said openings and tubular shells, and arranged with their axes substantially coincident with the axes thereof, means engaging the tubular shells and movable relatively thereto for adjusting the driven members lengthwise relatively to said tubular shells, and driving means within the casing for coöperating with the driven members, substantially as and for the purpose described.

22. In a vehicle, a casing provided with opposing openings inclined relatively to each other lengthwise of their axes from a horizontal plane and also provided with tubular shells alined with the opposing openings and having their axes substantially coincident with the axes of said openings, driven members revoluble in said openings and tubular shells, and arranged with their axes substantially coincident with the axes thereof, means for adjusting the driven members lengthwise relatively to said tubular shells, and driving means within the casing for coöperating with the driven members, substantially as and for the purpose described.

23. In a vehicle, a casing provided with opposing openings, and with a third opening arranged substantially midway between the opposing openings, driven members journaled in the opposing openings, a driving member journaled in the third opening and arranged with its axis at an angle, other than a right angle, to the axes of the driven members, and power-transmitting means within the casing connecting the driven and driving members, substantially as and for the purpose specified.

24. In a vehicle, a casing provided with opposing openings, and with a third opening arranged substantially midway between the opposing openings, an axle comprising a pair of revoluble shafts journaled, respectively, in the openings, ground-wheels carried by the outer ends of the shafts, gears of substantially equal diameter provided within the casing on the inner ends of the shafts, a driving member journaled in the third opening and arranged with its axis at an angle, other than a right angle, to said shafts, a gear within the casing revoluble with the driving member and being in mesh with the gear on one of the shafts and out of mesh with the gear on the other shaft, a second gear within the casing revoluble with the driving member and being in mesh with the gear on said other shaft and out of mesh with the gear meshing with the first-mentioned gear revoluble with the driving member, and equalizing gears within the casing carried by the driving member and connected to said gears revoluble with the driving member, substantially as and for the purpose described.

25. In a vehicle, a casing provided with opposing openings inclining relatively to each other lengthwise of their axes from a horizontal plane, and with a third opening arranged substantially midway between the opposing openings with its axis at an angle, other than a right-angle, to the axes of the opposing openings, driven members revoluble in the opposing openings and arranged with their axes substantially coincident with the axes of said opposing openings, a driving member revoluble in the third opening with its axis substantially coincident with the axis of said third opening, and power-transmitting means within the casing connecting the driven and driving members, substantially as and for the purpose specified.

26. In a vehicle, the combination with a casing provided with opposing openings, a third opening arranged substantially midway between the opposing openings at one side of the axes of said opposing openings, and a bearing opposite to the third opening at the opposite side of the axes of said opposing openings; of driven members revoluble in the opposing openings, a driving member projecting through the third opening and supported by said bearing, and power-transmitting means within the casing connecting the driven and driving members, substantially as and for the purpose set forth.

27. In a vehicle, the combination with a casing provided with opposing openings and with opposing lateral extensions arranged substantially midway between the opposing openings, one of said extensions having an opening in its outer end surface; of driven members revoluble in the opposing openings, a driving member projecting through the last-mentioned opening and provided with bearings supported by the opposing lateral extensions, and power transmitting means within the casing connecting the driven and driving members, substantially as and for the purpose described.

28. In a vehicle, the combination with a casing provided with opposing openings, and a third opening arranged substantially midway between the opposing openings; of driven members revoluble in the opposing openings, a driving member revoluble in the third opening, gears within the casing mounted on the driving member and coöperating with said driven and driving members, means on the driving member for preventing endwise movement of said gears in one direction, a sleeve in the opening for preventing endwise movement of the gears in the other direction, and means on the driving member coacting with said sleeve, substantially as and for the purpose specified.

In testimony whereof, I have hereunto signed my name in the presence of two attesting witnesses, at Syracuse, in the county of Onondaga, in the State of New York, this 3rd day of September, 1904.

ALEXANDER T. BROWN

Witnesses:
D. LAVINE,
ARTHUR E. PARSONS.